Oct. 21, 1958  K. B. SORENSEN ET AL  2,856,745
RAKE WHEEL FOR BEET HARVESTERS

Filed Aug. 6, 1954  3 Sheets-Sheet 1

INVENTORS
CHARLES S. MORRISON
KNUD B. SORENSEN
GEORGE H. SHRIVER
BY ARTHUR J. BJERKAN

ATTORNEYS

Oct. 21, 1958  K. B. SORENSEN ET AL  2,856,745
RAKE WHEEL FOR BEET HARVESTERS

Filed Aug. 6, 1954  3 Sheets-Sheet 2

INVENTORS
CHARLES S. MORRISON
KNUD B. SORENSEN
GEORGE H. SHRIVER
BY ARTHUR J. BJERKAN

ATTORNEYS

Oct. 21, 1958

K. B. SORENSEN ET AL 2,856,745

RAKE WHEEL FOR BEET HARVESTERS

Filed Aug. 6, 1954

INVENTORS
CHARLES S. MORRISON
KNUD B. SORENSEN
GEORGE H. SHRIVER
ARTHUR J. BJERKAN

BY

ATTORNEYS

United States Patent Office 2,856,745
Patented Oct. 21, 1958

---

2,856,745

RAKE WHEEL FOR BEET HARVESTERS

Knud B. Sorensen, Rock Island, Charles S. Morrison, Moline, George H. Shriver, Silvis Heights, and Arthur J. Bjerkan, Moline, Ill., assignors, by mesne assignments, to Deere & Company, a corporation of Delaware Application August 6, 1954, Serial No. 448,196

13 Claims. (Cl. 56—121.45)

The present invention relates generally to beet harvesters and more particularly to harvesters of the type that is provided with means for cutting off the tops from beet crowns before the beets are pulled or lifted from the ground.

The object and general nature of the present invention is the provision of new and improved means for moving the cut tops off the beet row to one side thereof so as to facilitate the action of the beet-lifting means that follow the top-deflecting means.

A further important feature of the present invention is the provision of top-deflecting means in the form of resilient or flexible rake teeth or fingers so constructed and arranged that during the active or top-deflecting portion of movement of the rake fingers or teeth, the latter move generally at right angles across the beet row, thereby acting simply and directly to move the tops out of the way of the subsequently operating beet-lifting means with a minimum amount of movement of the tops over the ground. A further feature of this invention is the provision of means for mounting and operating the rake teeth so that their movement is in such a direction with respect to ground resistance, taking into account the speed of forward travel and the speed of rotation, that the teeth are not flexed in any direction except that in which the teeth are particularly designed to be flexed. If, for example, the teeth are in the nature of flat springs or spring-like elements, then the teeth are arranged so that each tooth is flexed in a direction perpendicular to the plane of the teeth. Preferably, also, the teeth are arranged so that they are driven in a direction and at such rate as to counteract the effect of forward travel of the harvester along the beet row whereby, with respect to the ground surface, the rake teeth move substantially exactly transversely across the beet row.

More specifically, it is an important feature of this invention to provide rake teeth with inner coil spring sections, providing the desired extent of resiliency, with the teeth so mounted that the axis of the coil section of the lowermost tooth is such that when each tooth is deflected as it passes across the beet row, the direction of the deflection relative to the coil section is generally circumferentially around, or, in other words, substantially perpendicular to, the axis of the coil section.

A still further important feature of this invention is the provision of a dual wheel top raking or deflecting mechanism, including two rotor members spaced apart such a distance that they are adapted to pass along opposite sides of a beet row, with means for rotating the rake wheel members in the same direction, whereby the rake teeth of one wheel pass along the surface of the ground and up one side of the hill of the row while the teeth of the other rake wheel pass, in the same direction, down the other side of the hill or ridge of the row. In this way, all of the tops, leaves and the like severed by the topping means will be engaged by the rake wheel teeth and deflected entirely to one side of the beet row.

These and other objects and advantages of the present invention will be apparent to those skilled in the art after a consideration of the following detailed description, taken in conjunction with the accompanying drawings, in which.

Figure 1:
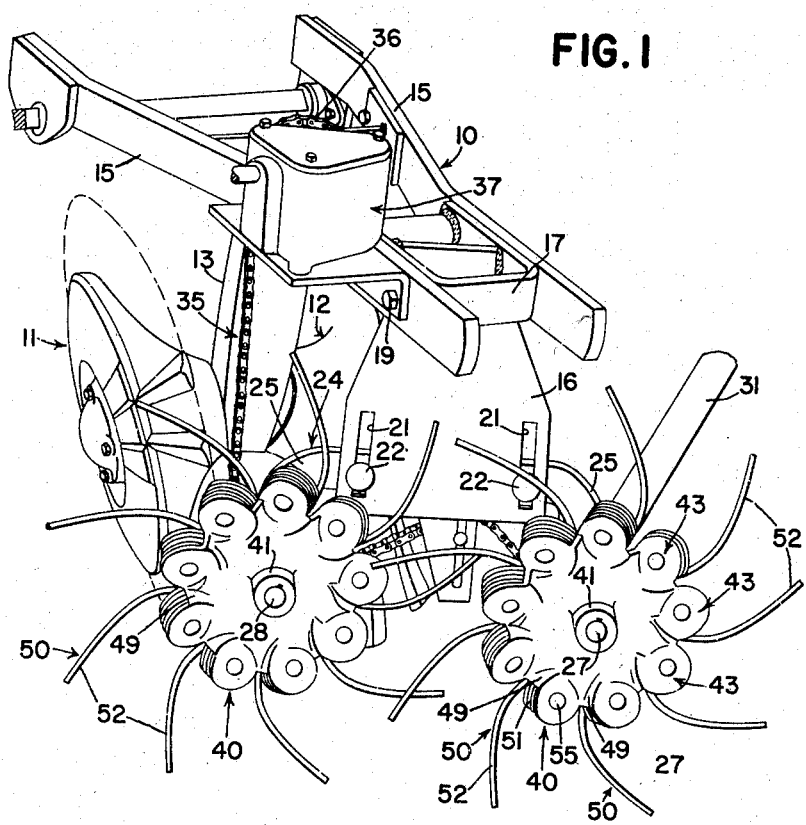
Fig. 1 is a fragmentary perspective view of a portion of a beet harvester, showing in detail the top-deflecting members and the following beet-lifting means.
Figure 2:
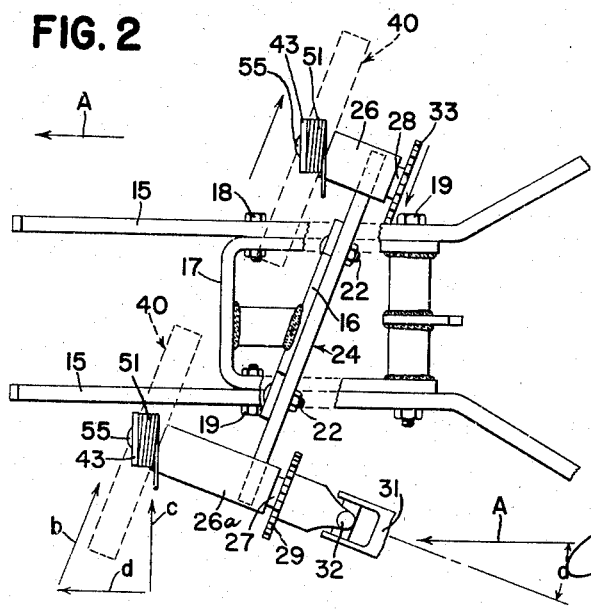
Fig. 2 is a fragmentary top view of the front portion of the structure shown in Fig. 1, each of the two rake tooth elements shown being the one at the bottom of the rake wheel, the other elements being omitted in the interest of clarity.

Referring first to Fig. 1, the beet harvester of the present invention is shown as incorporated in a beet-lifter frame structure 10 with which a pair of ground-entering, beet-lifting wheels 11 and 12 are connected, as by a standard 13. The frame 10 includes a pair of side bars 15 that converge forwardly, and between the forward ends of the bars 15 a generally vertical bracket plate 16 is disposed. The upper portion of the plate 16 is narrowed and secured, as by welding, to a U-shaped bracket 17 that is connected, as by bolts 18 and 19, to the frame bars 15. The lower and wider portion of the plate 16 is provided with a pair of slots 21 to receive a pair of bolts 22 that connect to the plate 16 a rake wheel supporting yoke 24. The latter member is generally U-shaped in elevation and has downturned end portions 25 to which bearing sleeves 26 and 26a are rigidly connected, as by welding or the like. As best shown in Fig. 2, the sleeve 26a is longer than the other sleeve 26 and both receive bearing means (not shown) by which a pair of shafts 27 and 28 are supported for rotation therein. Mounted on the shaft 28, or suitably connected thereto in any desired manner, is a sprocket wheel 29, and a driving shaft 31 is connected to the shaft 27 through a universal joint 32. Power is delivered to the shaft 31 for operating all of the parts connected therewith. A similar sprocket 33 is formed on or carried by the other shaft 28, and a drive chain 35, best shown in Fig. 1, is trained over the sprockets 29 and 33 and extends upwardly, as at 36, Fig. 1, where the chain passes over a sprocket (not shown) carried by a gear box 37. The portion of the chain 35 that extends upwardly from the sprocket 33 to the sprocket at the rear of the gear box 37 is behind the plate 16 and hence does not show in Figure 1. The gear box 37 receives power from the chain 35 and drives other parts (not shown) of the harvester. The bolts 22, disposed in the slots 21, serve to fix the yoke 24 in different positions of adjustment to the plate 16.

Figure 3:
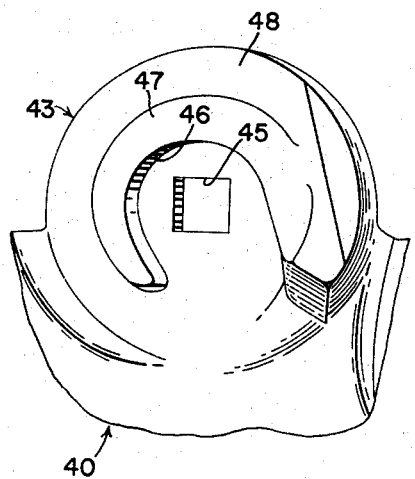
Fig. 3 is an enlarged face view or elevation of one of the spring seats of a rake wheel of the type shown in Fig. 1.
Figure 4:
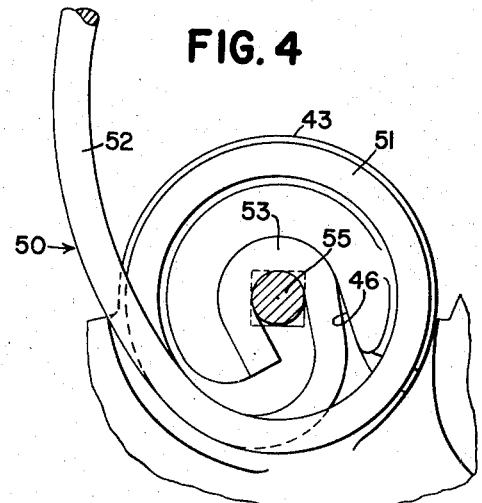
Fig. 4 is a fragmentary view, showing the manner of fastening the preferred form of rake teeth to the rake wheel.

As indicated above, the present invention is particularly concerned with the provision of new and improved top-deflecting means for moving the tops off the beet row to get them out of the way of the oncoming beet-lifting means, such as the wheels 11 and 12. Referring first to Fig. 1, secured to the front end of each of the shafts 27 and 28 is a rake wheel 40, each of the rake wheels 40 having a hub portion 41 fixed to the associated shaft, as by a key or the like, and the peripheral portion of each rake wheel 40 is formed with a plurality of spring-receiving seats 43. Each seat 43 is in the nature of a generally arcuate boss or pad apertured centrally, as at 45, and surrounding the aperture is a spring-end-receiving socket 46 shaped, as best shown in Fig. 3, in non-circular fashion and formed by an arcuate or horseshoe-shaped boss or ridge 47. Surrounding the arcuate ridge or rib 47 is a generally helical seat 48 for the associated spring finger. As best shown in Fig. 2, the plane of the spring-receiving seat or pad 43 is displaced angularly with respect to the general plane of the web of the rake wheel 40, one side of each spring seat 43, at one side of the plane of the rake wheel, being connected to the adjacent side of the next contiguous seat 43, at the other side of the general plane of the rake wheel by a generally transverse web section 49.

Secured to the rake wheels 40 is a plurality of top-deflecting teeth 50, preferably resilient members in the form of spring fingers, each having a coil section 51 forming the principal resilient portion of the member 50, a spring section 52 curved to extend generally backwardly relative to the direction of normal rotation of the rake wheel, and a hook end 53 forming an attaching section. The hook end 53 is shaped to snugly lie in the non-circular socket 46, with the adjacent outer coil of the spring section 51 lying against the inner edge of the boss portion 47. A bolt 55 extends through the hook end and the opening 45 and fixes the coil section 51 of the spring in position in the associated tooth-receiving portion 43 of the rake wheel.

As will be seen from Fig. 2, the coil-receiving section 43 makes an angle of about 20° with respect to the plane of the rake wheel, and therefore the axis of the associated spring coil section 51 also lies at an angle of about 70° with respect to the plane of rotation of the rake wheel. Each coil spring axis makes an angle of about 20° relative to the axis of rotation of the associated supporting shaft 27 or 28. Each of the shafts 27 and 28 is carried by the yoke 24 so as to make an angle of about 20° relative to the direction of forward travel, which is indicated by the arrow A in Fig. 2. Thus, the axis of the coil section at the lowermost part of the wheel, this being the spring section shown in full lines in Fig. 2, is disposed parallel to or in the direction of forward travel. Therefore, the path of movement of the top-deflecting spring finger section 52, as it crosses the beet row, is substantially exactly at a right angle to the longitudinal axis of the frame 10. The longitudinal axis of the frame is, of course, parallel to the direction of forward travel. Normal deflection of the spring member 50 occurs when the spring ends 52 move substantially in a path at right angles to the axis of the coil section 51. It will be noted, however, from Fig. 2, that each of the shafts 27 and 28 is disposed at an angle to the line of advance, as at $a$. Thus, when the rake wheels are rotated, the portions of the teeth crossing the row, at the lower portions of the rake wheels, have a backward component of movement relative to the harvester frame, the path of movement of the teeth relative to the frame being indicated by the arrow $b$ in the lower left-hand portion of Fig. 2. However, the shafts 27 and 28 are driven at such speed that the amount of backward component of movement of the tooth ends, relative to the frame, is substantially exactly equal to the amount of forward travel during the same period. This is represented by the arrow $d$ in the lower portion of Fig. 2. Therefore, the resultant of the several motions is that, when each tooth crosses the beet row, it moves generally along the path indicated by the arrow $c$ which is substantially exactly perpendicular to the row. In this way, the spring fingers have a longer life since, in crossing the beet row, they are stressed only in a generally peripheral direction relative to the supporting coil section 51 and no appreciable bending of the teeth in a fore-and-aft direction is present. In some cases, however, it may be desirable to deflect the beet tops with a motion that has a rearward component relative to the ground surface. This may be achieved by increasing the speed of rotation of the wheels 40, but in this case, it then becomes desirable to decrease the spring seat angle ($b$—$c$, Fig. 2) so as to retain the feature of this invention wherein the spring fingers 52 are deflected in a direction perpendicular to the coil axis.

Figure 5:
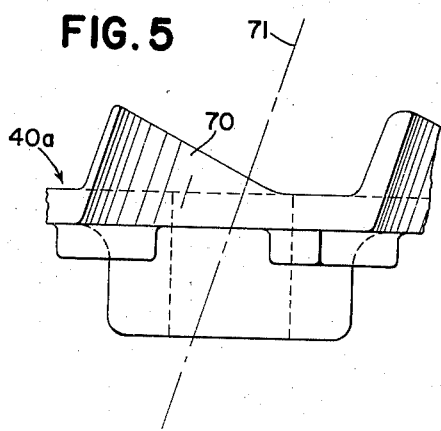
Fig. 5 is a fragmentary edge view of another form of rake wheel.
Figure 6:
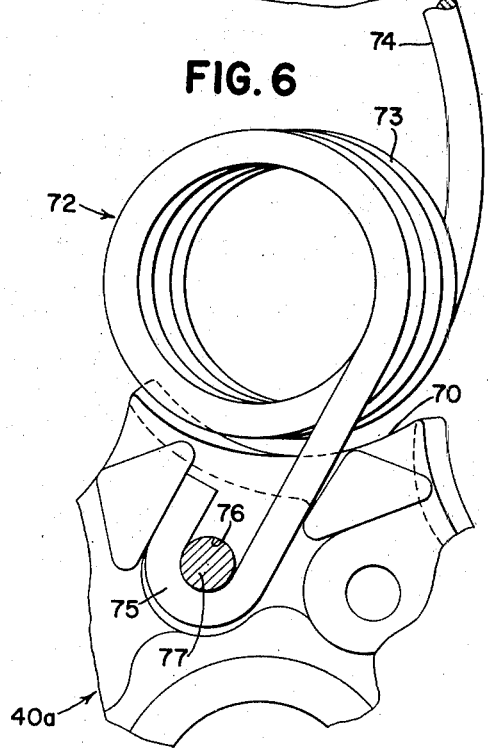
Fig. 6 is a fragmentary elevational view, showing the manner in which the rake teeth of this form of the invention are fixed to the rake wheel.

A modified form of the present invention is shown in Figs. 5–6. In this form, each of the rake wheels 40$a$ is provided with a plurality of coil-receiving seats 70, each being a part of a generally cylindrical surface, the axis of which is indicated at 71 and which axis extends generally at an acute angle relative to the plane of rotation of the rake wheel 40$a$, the angle being substantially the same as the angle between the axis of the coil 51 and the axis of rotation of the associated rake wheel in the form of the invention shown in Figs. 1 and 2. A spring rake tooth 72 is carried in each of the seats 70, the tooth 72 being generally similar to the tooth 50 described above, having adjacent one end a spring coil section 73 and at the other end a top-deflecting finger section 74. The innermost end of the coil section 73 is formed with an extending hook section 75 that is adapted to register with an opening 76 formed in the rake wheel adjacent the associated seat 70. A bolt 77 acts to hold each hook section to the rake wheel, thus fixing each rake finger in position. The angular relationships and the resultant motions in this form of the invention are substantially identical with that described above in connection with Fig. 2, and hence need not be repeated.

Figure 7:
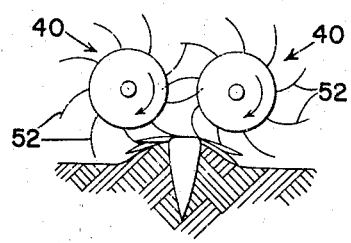
Fig. 7 is a detail view showing the action of the top-deflecting rake wheels passing down a row of beets that have been topped.

In operation, both of the rake wheels 40 (also 40$a$) are rotated in the same direction and they are spaced apart, as best shown in Fig. 7, a distance such that they readily straddle the row of beets. Generally, at harvest time, the beets grow in a ridge or elevated row, as is illustrated in Fig. 7, and in driving the harvester along the row of beets to be harvested, the laterally spaced apart rake wheels readily and efficiently sweep the tops, which have been previously cut off, entirely to one side of the row. Specifically, one of the two rake wheels has its top-contacting fingers moved generally upwardly at one side of the row while the top-engaging fingers of the other wheel move downwardly at the other side thereof. Thus, all the tops from both sides of the row are swept to a point laterally outwardly of the beet-lifting wheels. Also, the tops are moved entirely to one side of the beet-lifting wheels and do not become entangled therewith. Further, the tops are handled in such a way that they may later be picked up and utilized for stock feed or other purposes.

Figure 8:
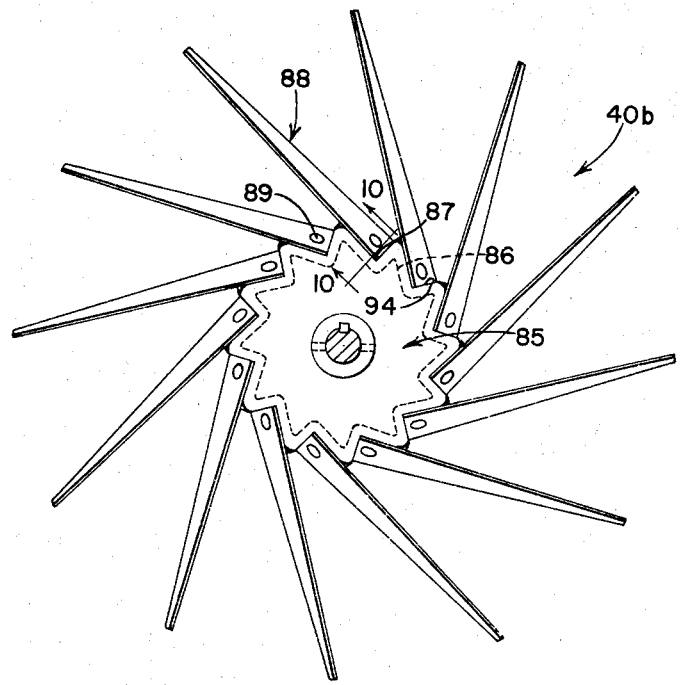
Fig. 8 is a face view of a modified form of rake wheel, employing flat spring-like teeth set at an angle in the peripheral portion of the wheel hub.
Figure 9:
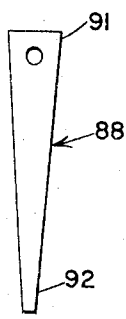
Fig. 9 is a detail view of one of the rake teeth employed in the form of the invention shown in Fig. 8.
Figure 11:
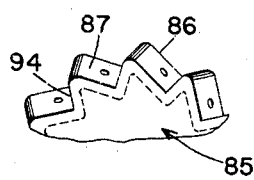
Fig. 11 is a fragmentary view of the hub member of the rake wheel shown in Fig. 8.
Figure 10:
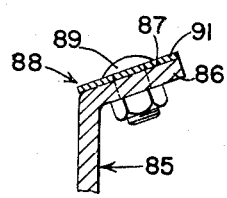
Fig. 10 is a sectional view taken along the line 10—10 of Fig. 8.

Referring now to Figs. 8 and 9, in these figures we have shown a further modified form of this invention wherein the rake teeth are in the nature of flat spring elements. As best shown in Fig. 8, the rake wheel 40$b$ in this form of the invention includes a hub section 85 formed with a laterally directed stepped or scalloped flange 86. These stepped or scalloped portions form tooth seats 87 to each of which a flat spring-like member 88 is secured, as by a bolt or rivet 89. The spring tooth elements 88 are of particular construction. They are wider at their base portions, as at 91, than they are at their tip ends 92 and, as will be seen from Fig. 8, they are formed of relatively thin spring-like material. This particular construction provides substantially uniform tooth loading for any normal degree of flexure of the tooth elements in operation. Also, the seats 87 are angled laterally so that for a given rate of rotation and speed of forward travel, each tooth element is drawn across the surface of the ground in a direction that is substantially perpendicular to the plane of the face of the tooth. In other words, when the speed of rotation and rate of forward travel are properly coordinated, the teeth 88 are flexed only in the direction in which they are designed to be deflected, namely, in a direction that is perpendicular to the plane of the tooth. The wheels 40b are adapted to be fixed to the shafts 27 and 28 in place of the wheels 40 or 40a.

While we have shown and described above the preferred structure in which the principles of the present invention have been incorporated, it is to be understood that our invention is not to be limited to the specific details shown and described above, but that, in fact, widely different means may be employed in the practice of the broader aspects of our invention.

What we claim, therefore, and desire to secure by Letters Patent is:

1. In a beet harvester, a top deflecting means for deflecting cut tops to one side of the beet row, said top deflecting means comprising a frame, a pair of toothed wheels, means supporting each of said wheels on said frame for rotation in a plane that extends generally transversely of the row and the normal direction of travel, said plane making an acute angle relative to the plant row, means connected with said wheels to rotate said wheels, said angle being such that for a given rate of forward travel and a given rate of rotation of said wheels, the lower teeth of the latter move substantially directly across the plant row in a direction along the ground generally normal to each of said toothed wheels, a plurality of resilient top-engaging members, each having a resilient portion and an outwardly extending top-engaging portion, said resilient portion being formed to facilitate repeated flexing of said member in a given direction relative to the associated wheel, means on each of said wheels forming member-receiving seats angled relative to the plane of rotation of the wheel so as to dispose each member on the wheel in such position that, when the member is in top-engaging position, said given direction of flexing of said member lies substantially directly transversely of the plant row and said normal direction of travel.

2. In an agricultural implement, a rake wheel construction for deflecting crop foliage and the like laterally of the direction of travel of the implement, said rake wheel construction comprising a pair of rotatable shafts, a rake wheel fixed to each shaft, a plurality of rake teeth, each including a coiled attaching portion adjacent one end of the tooth, and a plurality of seats on each wheel to receive said coiled attaching portions, each seat being shaped to lie in a cylindrical surface and each coiled portion including a generally cylindrical coil.

3. In a beet harvester, a top deflecting unit for deflecting cut beet tops laterally of the row of beets to be harvested, said unit comprising a frame, a shaft rotatably carried thereby and disposed in a generally horizontal plane with the shaft axis lying at an angle to the direction of forward travel, a plurality of resilient teeth, each of said teeth having a resilient section providing for normal resilient yielding of said teeth in a given plane, means connecting said teeth to said shaft so that for each tooth the plane of normal yielding of said tooth lies at an angle to a plane normal to said shaft, said latter angle being substantially equal to said first mentioned angle so that the normal direction of deflection of said teeth is substantially at a right angle to the direction of forward travel.

4. In a beet harvester, a top disposal unit for deflecting cut beet tops laterally off the row of beets to be harvested, said unit comprising a frame, a shaft rotatably carried thereby and disposed in a generally horizontal plane with the shaft axis lying at an angle to the direction of forward travel, a rake wheel fixed to said shaft, the peripheral portion of said rake wheel having a plurality of spring seats, each arranged at an acute angle relative to the plane of said wheel, and a resilient rake tooth attached to each seat, said angle being such that, at a given rate of shaft rotation and a given speed of forward travel, when a spring seat is at the bottom of the rake wheel the plane of said seat is disposed generally in the direction in which said tooth is flexed as it is drawn across a beet row.

5. In a beet harvester, a top disposal unit for deflecting cut beet tops laterally off the row of beets to be harvested, said unit comprising a frame, a shaft rotatably carried thereby and disposed in a generally horizontal plane with the shaft axis lying at an angle to the direction of forward travel, a rake wheel fixed to said shaft, the peripheral portion of said rake wheel having a plurality of spring seats, each arranged at an acute angle relative to the plane of said wheel, said angle being such that when a spring seat is at the bottom of the rake wheel the plane of said seat is disposed generally at a right angle to the direction of forward travel, and a plurality of rake teeth secured to said rake wheel, each of said rake teeth including a coiled section disposed against the associated spring seat and a generally radially outwardly extending top-engaging finger.

6. In a beet harvester, a top disposal unit for deflecting cut beet tops laterally off the row of beets to be harvested, said unit comprising a frame, a shaft rotatably carried thereby and disposed in a generally horizontal plane, a rake wheel fixed to said shaft, the plane of the wheel lying at a right angle to the axis of said shaft, a plurality of spring teeth, each having a coil adjacent one end and a top-deflecting portion adjacent the other end, means on said wheel forming coil-receiving seats on the peripheral portion of said wheel, said coil-receiving seats lying generally at an angle to the plane of said wheel so that the axis of each coil, as it moves into its lowermost position during rotation of said rake wheel, extends at an angle to the shaft axis and generally perpendicular to the direction of flexure of the tooth as it is drawn across the beet row.

7. In an agricultural implement, a rake wheel construction for deflecting crop foliage and the like laterally of the direction of travel of the implement, said rake wheel construction comprising a rotatable shaft, a rake wheel fixed thereto, a plurality of rake teeth, each including a coiled portion adjacent one end of the tooth, the other end having a top-deflecting portion, means forming on the peripheral portion of said rake wheel a plurality of coil-receiving seats, said seats being shaped and arranged to dispose the axis of each coil at an angle relative to the axis of rotation of said shaft, said angles being such that the lowermost top-deflecting portions of said teeth move substantially at a right angle relative to the direction of forward travel of the implement.

8. In a beet harvester, a top deflecting means for deflecting cut tops to one side of the beet row, said top deflecting means comprising a pair of rake wheels, each having a hub portion and a plurality of teeth, each tooth having a coil section at its inner end, each hub portion having along its periphery a plurality of tooth-receiving seats, means connecting the coil section of each tooth to its seat, the latter and said connecting means being arranged angularly relative to the associated wheel so that when the wheel is rotated during the normal travel of the harvester each tooth is stressed generally peripherally of the associated coil and in a direction lying in a plane generally perpendicular to the axis of the coil, and means connected with said rake wheels to rotate the latter.

9. In a beet harvester, a top deflecting unit for deflecting cut beet tops, comprising a generally horizontally disposed shaft, power means connected with said shaft to rotate the latter, said shaft being disposed at an acute angle relative to the normal direction of travel of the harvester, a wheel fixed to said shaft and having a plurality of radially outwardly facing sockets in the peripheral portion of the wheel, each socket being a part of a cylindrical surface the axis of which extends generally horizontally at an acute angle relative to the plane of rotation of the wheel, said latter angle being substantially equal to said first mentioned acute angle, a plurality of top-deflecting springs resiliently connected with said wheel in a peripherally spaced apart series, each having a coiled portion and a generally radially outwardly extending top-engaging finger, and means connecting each top-deflecting spring to said wheel with each coiled portion of the spring disposed in the associated socket with the axis of said coiled portion of said spring disposed at an angle to the plane of the path of movement of said top-deflecting spring, said latter angle being such that, in normal operation, each coil is flexed only generally circumferentially and not axially of the coil.

10. The invention set forth in claim 7, further characterized by said seats being apertured in their central portions, the coil portion of each rake tooth having a radially inturned bolt-receiving loop, an attaching bolt means for each socket holding each coil portion against the associated seat, and means on each seat non-rotatably receiving the associated spring loop.

11. In a beet harvester, a top disposal means for deflecting cut tops to one side of the beet row, said top disposal means comprising a pair of toothed wheels, means supporting each of said wheels for rotation in a plane that extends generally transversely of the row, means to rotate said wheels, each of said wheels having tooth elements, each of which includes a flat resilient member, and means fixing one end of each of said flat resilient members to the hub portion of said wheel at an angle relative to an axially directed line extending across the periphery of the wheel hub portion.

12. The invention set forth in claim 11, further characterized by said teeth being wider at their radially inner ends and tapering to a relatively narrow outer end.

13. In a beet harvester, a top disposal means for deflecting cut tops to one side of the beet row, said top disposal means comprising a pair of toothed wheels, means supporting each of said wheels for rotation in a plane that extends generally transversely of the row, means to rotate each wheel, each wheel having a peripheral portion formed as a plurality of substantially flat tooth seats, each tooth element including a flat part secured to one of said flat seats, said seats being disposed at such an angle that, when the wheel is rotated at a given speed and the harvester is driven at a given speed, the ground resistance acting on the lower teeth acts in a direction generally perpendicular to the face of the lowermost tooth.

References Cited in the file of this patent
UNITED STATES PATENTS

| | | |
|---|---|---|
| 269,792 | Johnston | Dec. 26, 1882 |
| 1,797,824 | Dirschauer | Mar. 24, 1931 |
| 1,978,717 | Oppenheim | Oct. 30, 1934 |
| 2,406,500 | Karl | Aug. 27, 1946 |
| 2,527,843 | Orendorff | Oct. 31, 1950 |
| 2,603,053 | Lipe et al. | July 15, 1952 |
| 2,680,343 | Enos | June 8, 1954 |
| 2,689,446 | Sorrels | Sept. 21, 1954 |
| 2,707,859 | Walker | May 10, 1955 |
| 2,711,065 | Orelind | June 21, 1955 |
| 2,751,739 | Paul | June 26, 1956 |